(12) United States Patent
Wang et al.

(10) Patent No.: US 11,827,194 B2
(45) Date of Patent: Nov. 28, 2023

(54) MULTI-MODE ELECTRO-HYDRAULIC BRAKE BOOSTING SYSTEM AND CONTROL METHOD THEREOF

(71) Applicant: Beijing Institute of Technology, Beijing (CN)

(72) Inventors: Weida Wang, Beijing (CN); Yanjie Wu, Beijing (CN); Changle Xiang, Beijing (CN); Liang Li, Beijing (CN); Jingang Liu, Beijing (CN); Zhongguo Zhang, Beijing (CN); Chao Yang, Beijing (CN)

(73) Assignee: Beijing Institute of Technology, Beijing (CN)

( * ) Notice: Subject to any disclaimer, the term of this patent is extended or adjusted under 35 U.S.C. 154(b) by 260 days.

(21) Appl. No.: 17/313,550

(22) Filed: May 6, 2021

(65) Prior Publication Data
US 2021/0347349 A1    Nov. 11, 2021

(30) Foreign Application Priority Data

May 6, 2020    (CN) .......................... 202010373944.9

(51) Int. Cl.
*B60T 13/74*    (2006.01)
*B60T 8/171*    (2006.01)
(Continued)

(52) U.S. Cl.
CPC ............ *B60T 13/745* (2013.01); *B60T 8/171* (2013.01); *B60T 8/885* (2013.01); *B60T 13/165* (2013.01);
(Continued)

(58) Field of Classification Search
CPC ...... B60T 13/745; B60T 7/042; B60T 13/662; B60T 13/686; B60T 8/4077;
(Continued)

(56) References Cited

U.S. PATENT DOCUMENTS 4,918,921 A * 4/1990 Leigh-Monstevens ...................... F16D 48/04
74/388 R
5,302,007 A * 4/1994 Morita .................... B60T 8/266
303/113.5

(Continued)

*Primary Examiner* — Nicholas J Lane
*Assistant Examiner* — Stephen M Bowes
(74) *Attorney, Agent, or Firm* — Neugeboren O'Dowd PC

(57) ABSTRACT

Disclosed is a multi-mode electro-hydraulic brake boosting system and a control method thereof. When the boosting system fails, an emergency mechanical braking mode is achieved through structural redundancy, in a normal boosting mode, the system has a general braking mode and an emergency braking mode according to the strength requirements of a brake, and a general brake boosting mode and an emergency active pressurizing mode are controlled, respectively. Accurate boosting can be provided in the general braking process so that the pressure of a brake master cylinder can accurately follow target pressure, pressure buildup of the brake master cylinder can be completed more quickly in the emergency braking process, braking force is output to the maximum extent, the system response time of an emergency braking working condition is shortened, the braking capacity is improved, and traffic accidents are avoided.

3 Claims, 11 Drawing Sheets

(51) Int. Cl.
*B60T 8/88* (2006.01)
*B60T 13/16* (2006.01)

(52) U.S. Cl.
CPC ..... *B60T 2270/404* (2013.01); *B60T 2270/82* (2013.01); *B60T 2270/88* (2013.01)

(58) Field of Classification Search
CPC ........ B60T 8/3265; B60T 8/171; B60T 8/885; B60T 13/165; B60T 2270/404; B60T 2270/82; B60T 2270/88; B60T 8/174; B60T 8/3275; B60T 2220/04
See application file for complete search history.

(56) References Cited

U.S. PATENT DOCUMENTS

| | | | |
|---|---|---|---|
| 2003/0024245 A1* | 2/2003 | Fulks | B60T 13/745 60/545 |
| 2012/0324882 A1* | 12/2012 | Mori | B60T 13/745 60/545 |
| 2013/0025273 A1* | 1/2013 | Nozawa | B60T 13/662 60/545 |
| 2017/0158181 A1* | 6/2017 | Jiang | B60T 13/745 |
| 2018/0001881 A1* | 1/2018 | Huang | B60T 8/17 |
| 2018/0170328 A1* | 6/2018 | Yoshizu | B60T 8/3255 |
| 2018/0297570 A1* | 10/2018 | Tione | F15B 1/024 |

* cited by examiner

MULTI-MODE ELECTRO-HYDRAULIC BRAKE BOOSTING SYSTEM AND CONTROL METHOD THEREOF

CROSS REFERENCE TO RELATED APPLICATION(S)

This patent application claims the benefit and priority of Chinese Patent Application No. 202010373944.9, filed on May 6, 2020, the disclosure of which is incorporated by reference herein in its entirety as part of the present application.

TECHNICAL FIELD

The present disclosure relates to the technical field of vehicle safety, and particularly relates to a multi-mode electro-hydraulic brake boosting system and a control method thereof.

BACKGROUND ART

Along with the development of motorization and intelligentization of automobiles, X-By-Wire of automobiles becomes a trend. Brake by wire system can realize decoupling between pedal force and wheel braking force, the braking force is high in control precision and quick in response, and an upper-layer system is allowed to actively intervene, so that the system becomes the development direction of a future automobile braking system. The brake by wire system often includes electro-hydraulic brake (EHB) and electronic mechanical brake (EMB).

EHB system can be developed based on an existing 12V power supply system, is convenient to use, and is still a mainstream choice for commercial application over the next few years. How to bring better braking experience to the driver on the basis of guaranteeing the safety of people and vehicles is a key step in commercial application.

In 2013, the German company Robert Bosch GmbH launched an electromechanical booster iBooster, and the mechanism has multiple functions including active braking, variable boost ratio and the like. The NBooster brake by wire of Shanghai Nasn Automotive Electronics Co., Ltd has also cooperated with Beijing Automotive Group Co., Ltd., and has achieved mass production.

Related scholars have also discussed the EHB system. In the aspect of a hydraulic pressure control algorithm, traditional PID, expanded PID, self-adaption, robust control and other methods are provided. An EHB hardware-in-loop simulation platform based on dSPACE is built by Ding Haitao and so on, and the hydraulic characteristics of the system and the pressurization characteristic of an electromagnetic valve are tested. A brake pedal feeling evaluation standard is introduced by Zhao Kegang and so on, a fuzzy brake intention judgment method is provided, and the rationality of a boosting method is verified through HIL simulation. The dynamic response and control characteristics of the EHB system are tested by Chen Huiyan through a road test method. An electro-hydraulic composite braking model of a first-order system with a lag link is built by Yu Zhouping with Simulink, and a matching method in a composite braking system is analyzed and researched emphatically.

However, the above prior art has focused on distribution and precise control of hydraulic pressure, and pressure distribution and cooperative control of HCU. More importantly, in an existing hydraulic brake boosting system in the prior art, brake operation of the driver is in one-to-one correspondence with braking force, and a braking system is difficult to involve actively to ensure the safety of the driver and the vehicle and realize the function of active safety in the emergency situations such as improper operation of the driver or difficulty in guaranteeing the safety of the driver and the vehicle only by the response of the driver. Therefore, the design and control of the multi-mode EHB boosting system for different working conditions are particularly important.

SUMMARY

The present disclosure provides a multi-mode electro-hydraulic brake boosting (EHB) system and a control method thereof, which are mainly used for solving the defects and problems mentioned in the background art. In order to bring better braking experience to a driver on the basis of guaranteeing the safety of people and vehicles, multiple boosting modes are considered when the EHB system is controlled. Therefore, the control precision and the brake comfort of the brake boosting system are improved, and the EHB system has very high application value.

In an embodiment, the present disclosure describes:

According to the multi-mode electro-hydraulic brake boosting (EHB) system and the control method thereof, the EHB system is a non-decoupling electro-hydraulic brake (EHB) boosting system provided with a relative displacement sensor, the electro-hydraulic brake boosting system is composed of a small gear, a motor, a brake master cylinder, a Hall sensor, a feed screw nut, a large gear, a pedal and a ball screw, the motor is meshed with the large gear through the small gear, the large gear is fixedly connected with the feed screw nut, the ball screw can slide along the axis of the feed screw nut, the pedal is connected with one end of the ball screw, the Hall sensor is installed at the other end of the ball screw, and a permanent magnet is embedded into a push head of the brake master cylinder; the system has two control working modes, namely an electro-hydraulic boosting mode and an emergency mechanical braking mode, wherein when the motor works, the motor rotates, the small gear drives the feed screw nut to rotate, and the feed screw nut is connected with the ball screw, so that the ball screw is pushed to move horizontally, the brake master cylinder is further pushed to be pressurized, meanwhile, the pedal is driven to move forwards, pressure buildup of the master cylinder is achieved, and the Hall sensor detects the distance between the ball screw and the bottom of the push head of the brake master cylinder, a signal is fed back to a controller for boosting current control, general braking or emergency braking is carried out, and the electro-hydraulic boosting mode is adopted at the moment;

in the electro-hydraulic boosting mode, the braking strength is divided into a general braking type and an emergency braking type according to requirements, the EHB boosting system regulates and controls the boosting magnitude according to a preset boosting curve and values collected by the Hall sensor in the general braking process, the EHB boosting system enters an emergency active pressurizing control mode in the emergency braking process, when the EHB boosting system is in the emergency active pressurizing control mode, the controller does not need boosting according to the values collected by the Hall sensor, but quickly drives the motor through active pressure control directly, and the pressure of the master cylinder is increased to a preset maximum pressure value; and when boosting fails, namely the motor does not work, the small gear, the motor, the brake master cylinder, the Hall sensor, the feed screw nut, the large gear, the pedal and the ball screw do not work anymore, acting force is generated by a driver through the pedal, the acting force is directly transmitted to an inner core of the ball screw, and then the force is transmitted to the push head of the master cylinder through direct contact between the inner core and the push head of the main master, the brake master cylinder is pushed to be pressurized, braking can still be realized under the condition that boosting fails, and the emergency mechanical braking mode is adopted at the moment.

In some versions of the above, the electro-hydraulic brake boosting system is further equipped with a driving assistance system and is provided with a relative displacement sensor, a pressure sensor and a controller, the relative displacement sensor is used for collecting braking actions of the pedal, the pressure sensor is used for collecting pressure data of the brake master cylinder, and data of the relative displacement sensor and data of the pressure sensor are all uploaded to the controller, and the controller is connected with the motor; and the braking actions of the driver are collected to the controller through the relative displacement sensor, the braking strength is divided into a general braking type and an emergency braking type through logic threshold judgment of the controller, and different control modes are adopted respectively.

In the technical scheme, when the controller recognizes that the braking strength is in the general braking type, the electro-hydraulic brake boosting system adopts a general brake boosting mode; and when an upper-layer algorithm recognizes that emergency braking is needed in the current driving condition, the system immediately enters the emergency active pressurizing mode, the motor is rapidly controlled to achieve rapid pressure buildup of the brake master cylinder, braking is carried out, target pressure is given to be the preset maximum pressure of the brake master cylinder, and the pressure of the system is fed back in real time through the pressure sensor.

In some versions of the above, the controller is a double-closed-loop electro-hydraulic boosting brake controller and consists of a PI controller and a fuzzy controller. After the target pressure is set, error Ep between the target pressure and the current master cylinder pressure and an error change rate dEp obtained through a differential link are subjected to filtering processing and then serve as input to the fuzzy controller, parameter adjustment is carried out according to a fuzzy rule to obtain corrected values $k^*_p$ and $k^*_i$ of two parameters of the PI controller, and final parameters $k_p$ and $k_i$ of the controller are obtained after linear combination of initial parameters $k_{p0}$ and $k_{i0}$, and PI control is carried out for the pressure of the master cylinder.

The multi-mode electro-hydraulic brake boosting system and the control method provided by the present disclosure are convenient to use, low in manual maintenance cost and very high in practical application value, and have the following beneficial effects:

firstly, a stable braking feeling is provided for the driver, and when the braking strength of the vehicle is general braking, the general brake boosting mode is adopted for control; when the braking strength is in an emergency braking working condition, an emergency active pressurizing mode is started, and the pressure of the main cylinder is increased at the maximum speed for braking;

secondly, aiming at the non-decoupling electro-hydraulic boosting system adopting the relative displacement sensor, an opening range of +/−100 is designed, numerical values of the sensor are quantified, and the rigidity of the system is enhanced through reverse boosting; and thirdly, the results of a vehicle test show that the double-closed-loop pressure controller can preferably follow the target pressure; and under multiple pedal action tests, the controller can accurately and quickly realize different brake controls. Therefore, the multi-mode electro-hydraulic brake boosting system and the control method thereof are superior to a common boosting method, and the safety and drivability of the vehicle can be improved.

The following references are used in drawings:

1, small gear; 2, motor; 3, brake master cylinder; 4, Hall sensor; 5, feed screw nut; 6, large gear; 7, pedal; and 8, ball screw.

DETAILED DESCRIPTION OF THE EMBODIMENTS

To facilitate the understanding of the present disclosure, the present disclosure will be further described in detail hereinbelow with reference to the attached drawings and embodiments thereof. However, the present disclosure may be realized in many different forms and is not limited to the embodiments described herein.

Unless otherwise defined, all technical and scientific terms used herein shall have the same meanings as commonly understood by those skilled in the art to which the specification belongs. The terms used in the specification of the present disclosure are merely intended to describe specific embodiments but not intended to constitute any limitation on the present disclosure. As used herein, the term "and/or" includes any and all combinations of one or more of the associated listed items.

1 Multi-Mode EHB Boosting System

Figure 1:
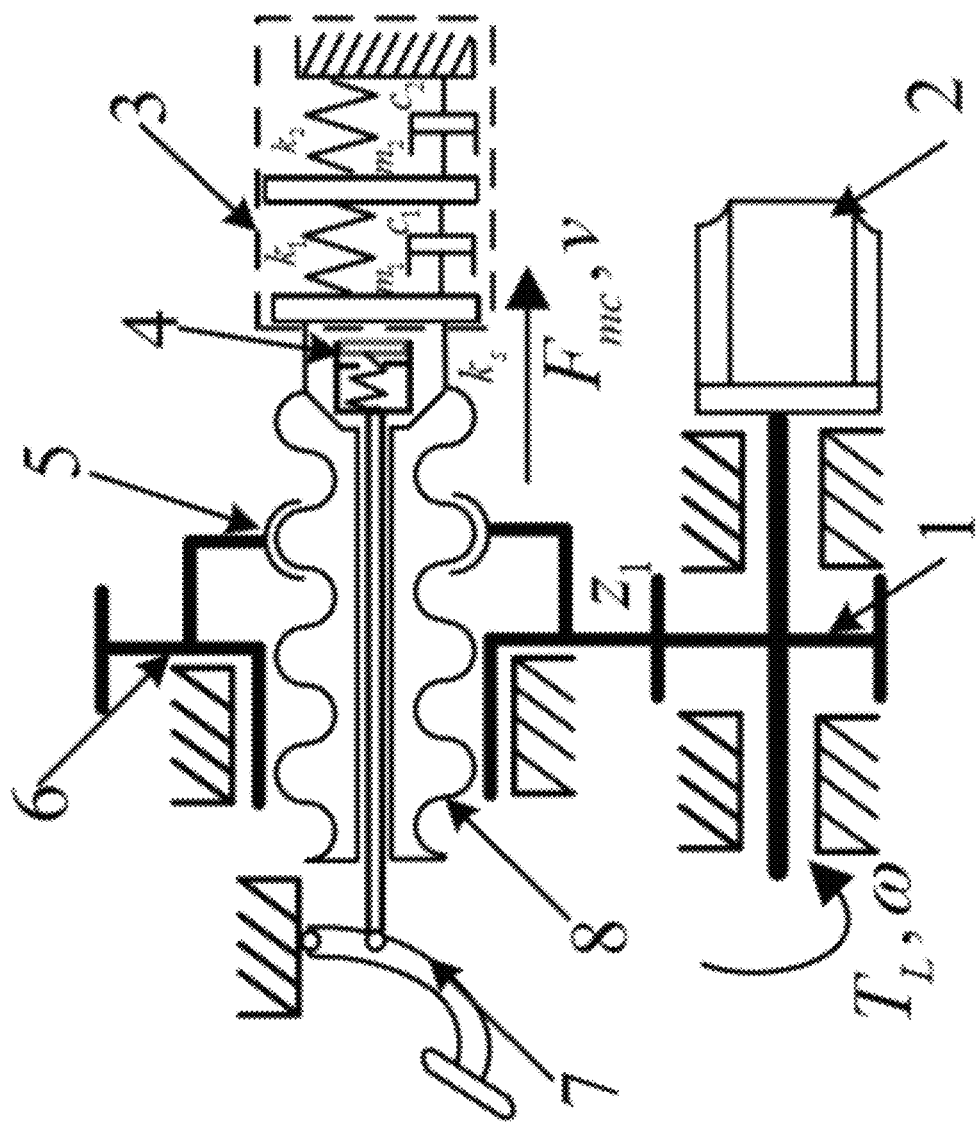
FIG. 1 is a structural schematic diagram of an EHB boosting system of a multi-mode electro-hydraulic brake boosting system and a control method thereof in the present disclosure.

According to a multi-mode electro-hydraulic brake boosting system and a control method thereof, the EHB system is a non-decoupling electro-hydraulic brake (EHB) boosting system provided with a relative displacement sensor, as shown in FIG. 1, the EHB boosting system is composed of a small gear 1, a motor 2, a brake master cylinder 3, a Hall sensor 4, a feed screw nut 5, a large gear 6, a pedal 7 and a ball screw 8, the motor 2 is meshed with the feed screw nut 5 through the small gear 1, the feed screw nut 5 slides around the ball screw 8, the large gear 6 is meshed with the feed screw nut 5, the pedal 7 is connected with an inner core of the ball screw 8, and the tail end of the ball screw 8 is connected with the brake master cylinder 3 through the Hall sensor 4, wherein when the motor 2 works, the motor rotates, the small gear 1 drives the feed screw nut 5 to rotate, and the feed screw nut 5 is connected with the ball screw 8, so that the ball screw 8 is pushed to move horizontally, the brake master cylinder 3 is further pushed to be pressurized, meanwhile, the pedal 7 is driven to move forwards, pressure buildup of the master cylinder 3 is achieved, and the electro-hydraulic boosting mode is adopted at the moment; and when the motor 2 does not work, acting force is generated by a driver through the pedal 7, the acting force is directly transmitted to the inner core of the ball screw 8, so that the feed screw nut 5 is driven to slide with the large gear 6, and then the force is transmitted to the brake master cylinder 3 through the Hall sensor 4, the brake master cylinder 3 is pushed to be pressurized, braking can still be realized under the condition that boosting fails, and the emergency mechanical braking mode is adopted at the moment.

2 Brake Boosting Control Method

In a traditional hydraulic brake boosting system, braking operation of the driver is in one-to-one correspondence with braking force of a brake. The EHB boosting system has an important function that actives control for the pressure of the brake master cylinder, and a braking system can actively ensure the safety of the driver and the vehicle and realize active safety in emergency situations such as improper operation of the driver or difficulty in guaranteeing the safety of the driver and the vehicle only by the response of the driver. Therefore, the design and control of the multi-mode EHB boosting system are particularly important.

Figure 2:
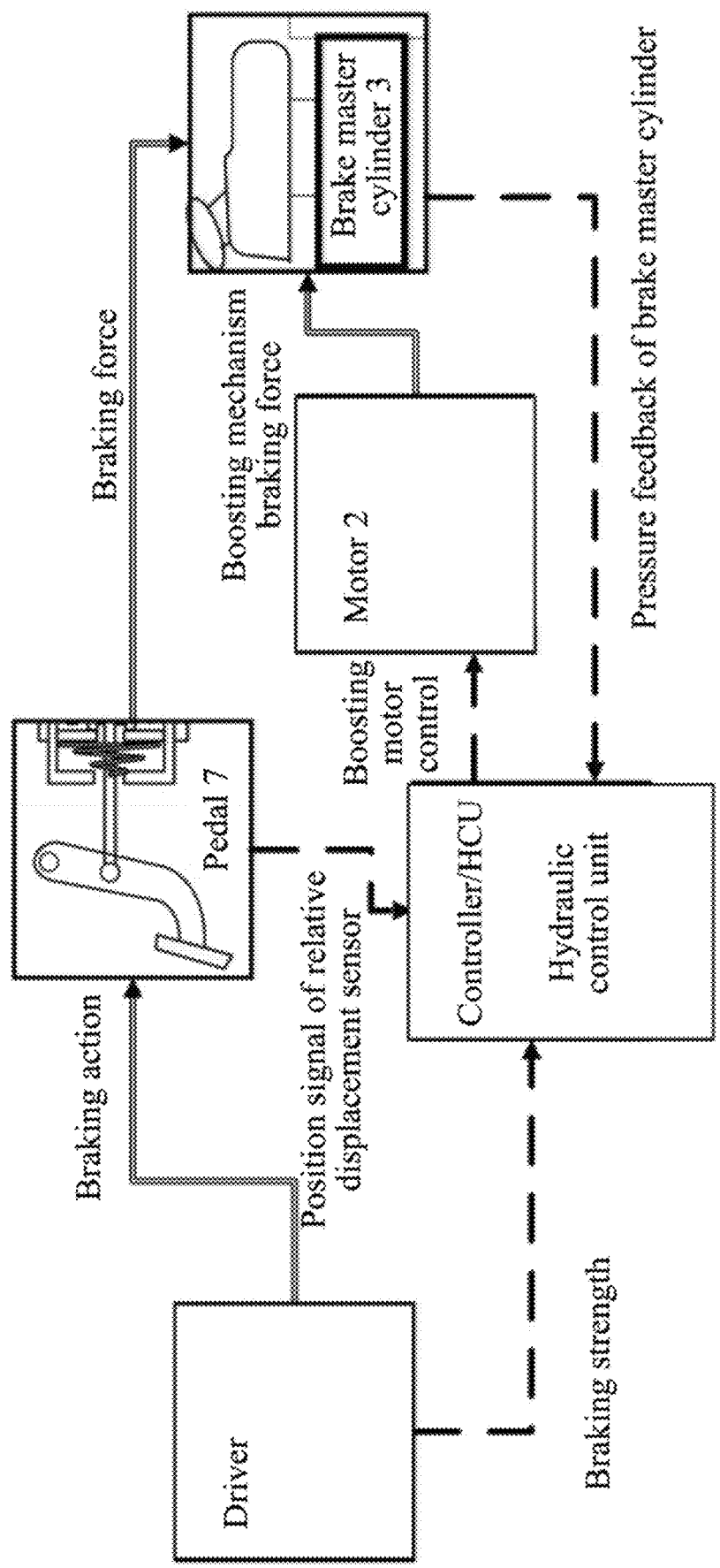
FIG. 2 is a schematic diagram of a control method based on driver braking intention recognition in an EHB boosting system and a control method thereof based on driver braking intention recognition.

In FIG. 2, a hydraulic control unit (HCU) is an actuating mechanism of a controller. HCU is the actuating mechanism of an electronic control braking system, and generally consists of a pressure increasing valve (a normally open valve), a pressure reducing valve (a normally closed valve), a liquid return pump and an energy accumulator. The pressure increasing valve and the pressure reducing valve are controlled by ECU signals to achieve opening and closing of a liquid path, and therefore the conventional braking process, the pressure maintaining braking process, the pressure reducing braking process and the pressure increasing braking process are achieved. An electric pump consists of a plunger type oil pump and a driving motor, and is mainly used for actively increasing brake hydraulic pressure.

When the controller recognizes that the driver intention is general braking, the EHB boosting system adopts a general brake boosting mode to control boosting current; and when the driver intention is recognized to be emergency braking, the system immediately enters an emergency active pressurizing mode, the motor is rapidly controlled to achieve rapid pressure buildup of the brake master cylinder, and braking is carried out. It needs to be noted that when an electro-hydraulic boosting controller of the EHB system is combined with an advanced driver assistance system or an unmanned driving scene and an upper-layer algorithm recognizes that emergency braking is needed in the current driving condition, the EHB system needs to immediately enter the emergency active pressurizing mode, emergency braking is carried out, and the control mode is judged by adopting a logic threshold method.

2.1 Boosting Current Control Method

Figure 3:
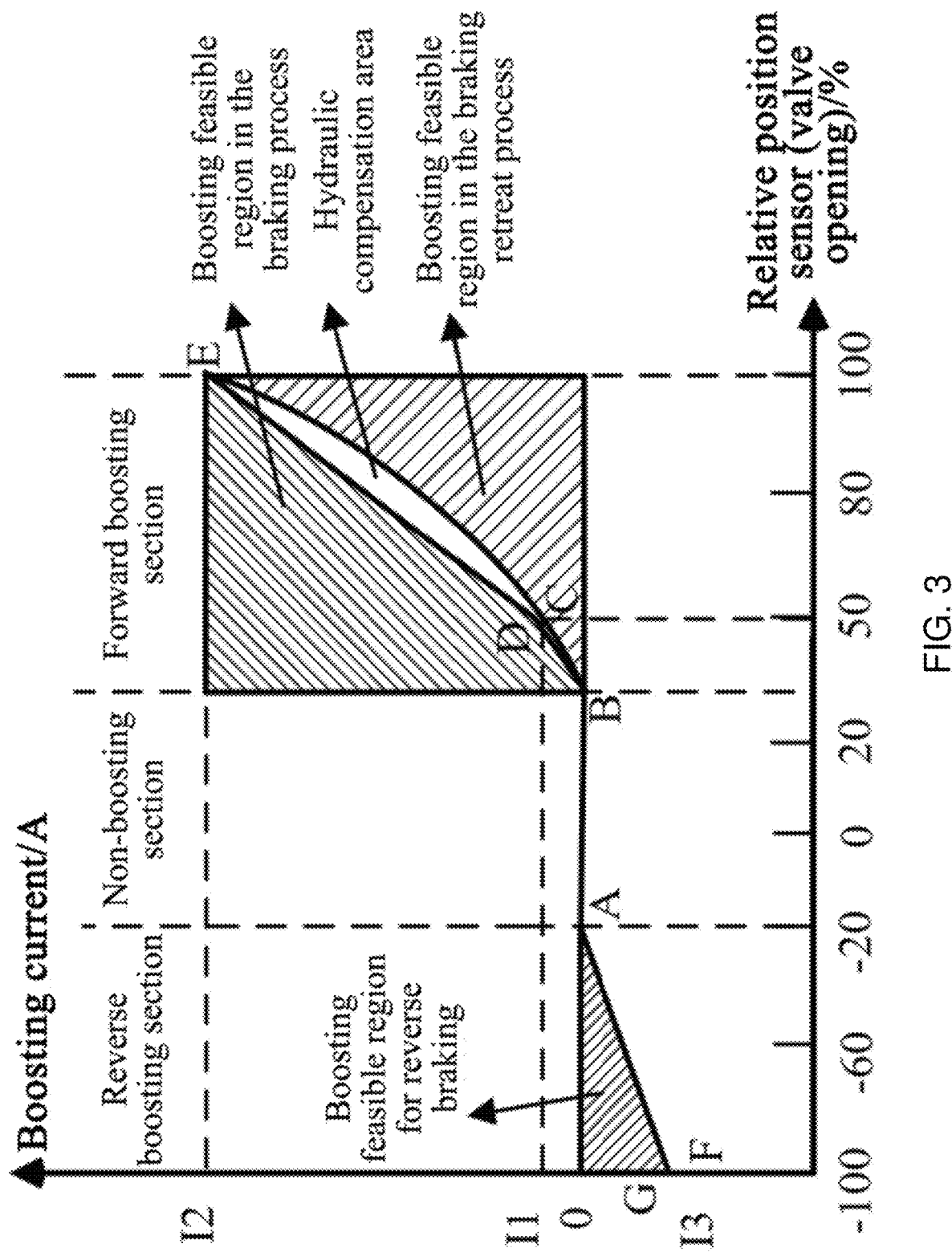
FIG. 3 is a boosting current graph of the multi-mode electro-hydraulic brake boosting system and the control method thereof in the present disclosure.

The first purpose of boosting current control is to guarantee good pedal feeling and meet the driving habit of the driver, and the second purpose of boosting current control is to build enough hydraulic force and meet the braking requirement. In the present disclosure, the position of the relative displacement sensor is quantified as numerical values of +/−100, which are defined as valve openings. Then, different target current values are designed according to the valve openings, boosting is generated, and a boosting curve results, as shown, for instance, in FIG. 3.

The boosting area is divided into three sections of a reverse boosting section, a non-boosting section and a forward boosting section. When the valve openings are in the AB range, an idle stroke stage is achieved, and boosting of the motor is not achieved.

When the driver steps on the pedal to overcome the idle stroke of the AB section and then enters the BC section, boosting current begins to be generated, and after the valve openings enter the CE section, the boosting current begins to rise at a large speed. In the figures, a boosting current feasible region in the braking process is applied, and a boosting curve in any shape can be designed according to actual system characteristics in the region. When the driver gradually quits braking, like a hydraulic compensation area in the figures, due to hydraulic pressure lag, the descending rate of the target boosting current is higher than the ascending rate, and the influence caused by hydraulic pressure lag needs to be compensated by reducing the boosting. Similarly, the boosting curve in any shape can be designed according to actual system characteristics in the region.

If the system rigidity is insufficient, even if the resilience force of springs of the pedal and the hydraulic feedback force act simultaneously, the resilience rate of the pedal may still not keep up with the foot of the driver, and additional active control may be needed to control the pedal so that the pedal is made to follow the foot. Therefore, the position of [−100, 0] is designed through the valve openings, and when the driver quickly retracts the foot, the position of the sensor becomes a negative value, and reverse boosting of the motor is realized.

2.2 Active Pressure Control Method

Figure 4:
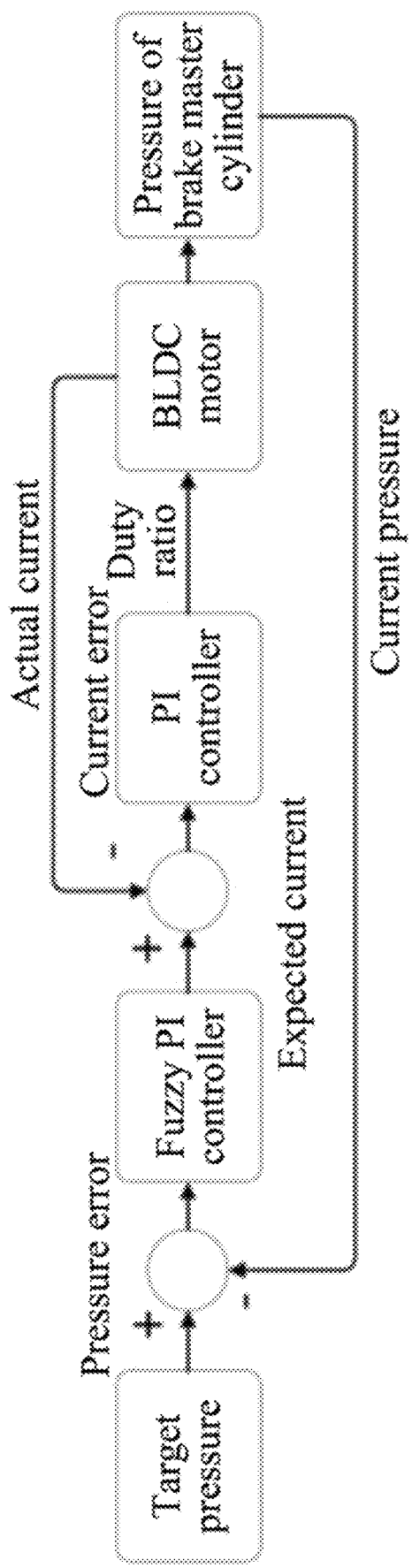
FIG. 4 is a schematic diagram of a controller in a double-closed-loop electro-hydraulic boosting mode of the multi-mode electro-hydraulic brake boosting system and the control method thereof in the present disclosure.

When the upper-layer algorithm recognizes that emergency braking is needed in the current driving condition, the controller immediately enters the emergency active pressurizing mode, target pressure is given to be the preset maximum pressure of the brake master cylinder, the pressure buildup process of the master cylinder is completed in the shortest time through pressure closed-loop control for emergency braking, the safety of people and vehicles is guaranteed, and the function of active safety is achieved. In an actual system, the pressure sensor can feed back the pressure of the brake boosting system of the braking system in real time, and closed-loop control is achieved. Accurate pressure control is the premise of guaranteeing active pressure control performance, therefore, a double-closed-loop electro-hydraulic boosting brake controller with an outer ring pressure fuzzy proportional integral (PI) controller and an inner ring current PI controller is used, and the structure of the double-closed-loop electro-hydraulic boosting brake controller can be as shown in FIG. 4.

Figure 5:
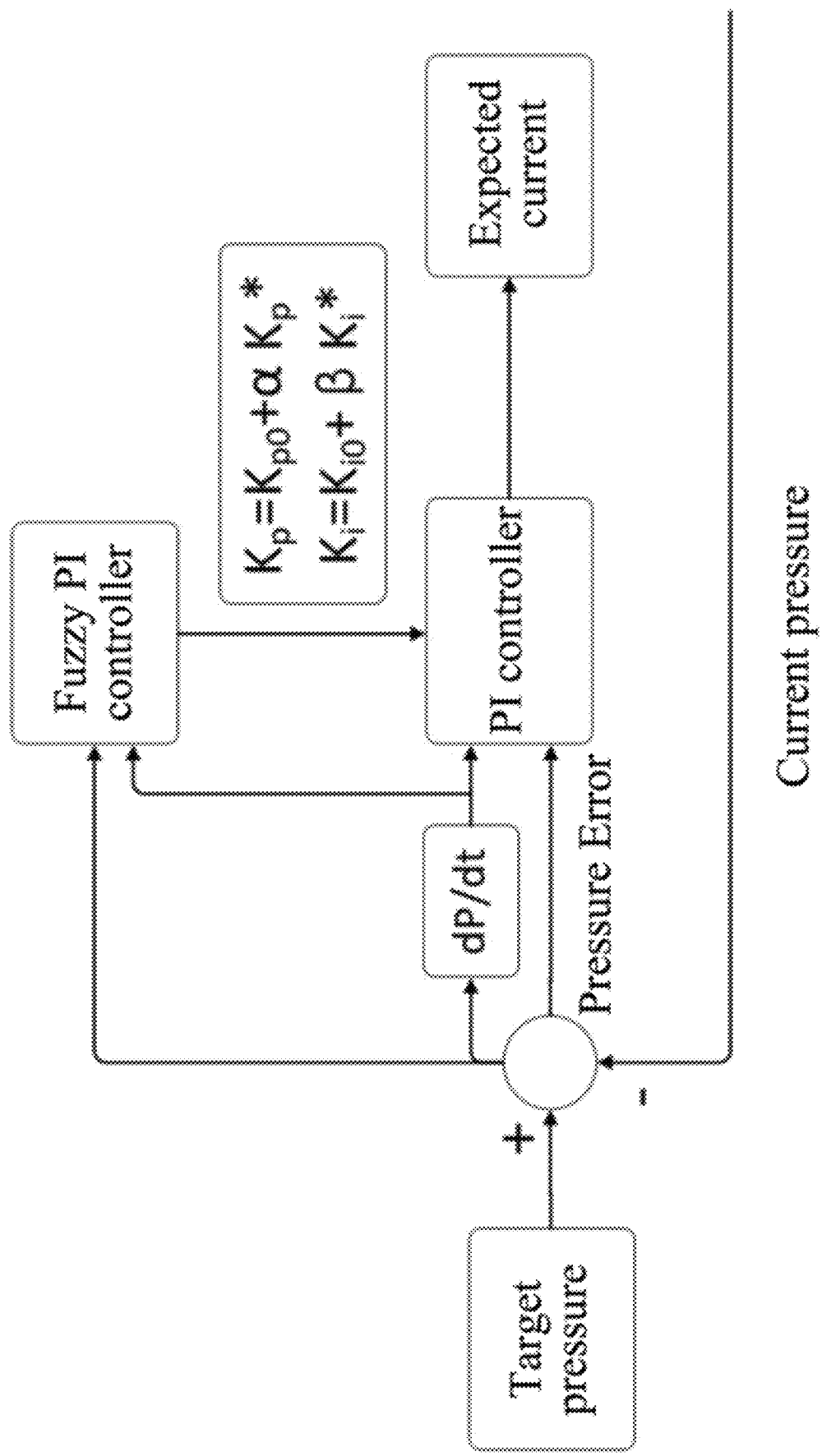
FIG. 5 is a schematic diagram of a fuzzy PI controller for the multi-mode electro-hydraulic brake boosting system and the control method thereof in the present disclosure.

As shown in FIG. 5, the fuzzy PI controller mainly consists of a PI controller and a fuzzy controller. After the target pressure is set, error Ep between the target pressure and the current master cylinder pressure and an error change rate dEp obtained through a differential link are subjected to filtering processing and then serve as input of the fuzzy controller, parameter adjustment is carried out according to a fuzzy rule to obtain corrected values $k^*_p$ and $k^*_i$ of two parameters of the PI controller, and final parameters $k_p$ and $k_i$ of the controller are obtained after linear combination of initial parameters $k_{p0}$ and $k_{i0}$, and PI control is carried out for the pressure of the master cylinder.

4 Vehicle Test and Result Analysis

In order to verify the control effect of the electro-hydraulic brake boosting control method, a vehicle test was carried out depending on a four-wheel distributed driving test vehicle equipped with an EHB brake boosting device implemented according to an embodiment of the present disclosure.

Signals such as signals of the relative displacement sensor and states of the EHB system were sent out by the controller, and the pressure of the brake master cylinder was sent out by the pressure sensor and collected through a CAN bus.

4.1 Pressure Active Control Effect Test

Figure 6:
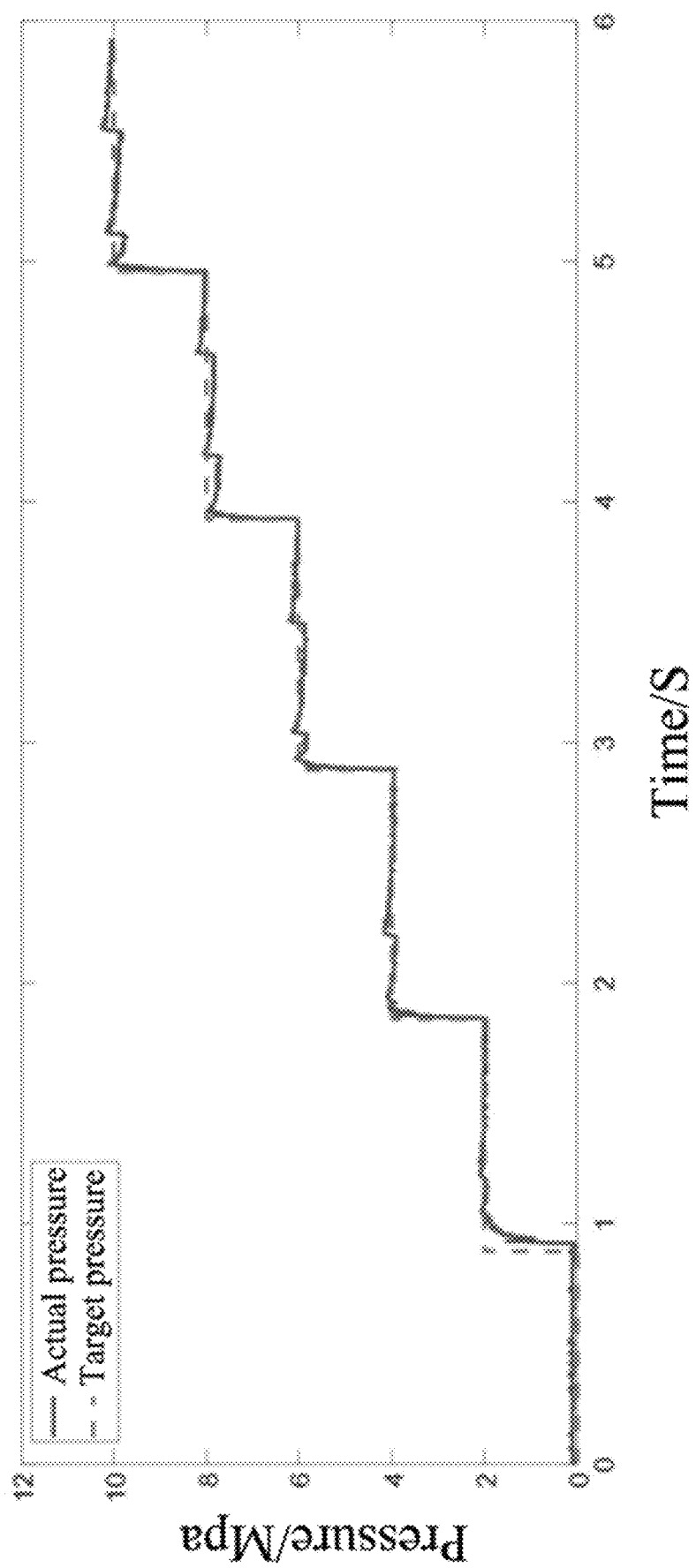
FIG. 6 is a schematic diagram of a pressure control mode step-input response curve for the multi-mode electro-hydraulic brake boosting system and the control method thereof in the present disclosure.
Figure 7:
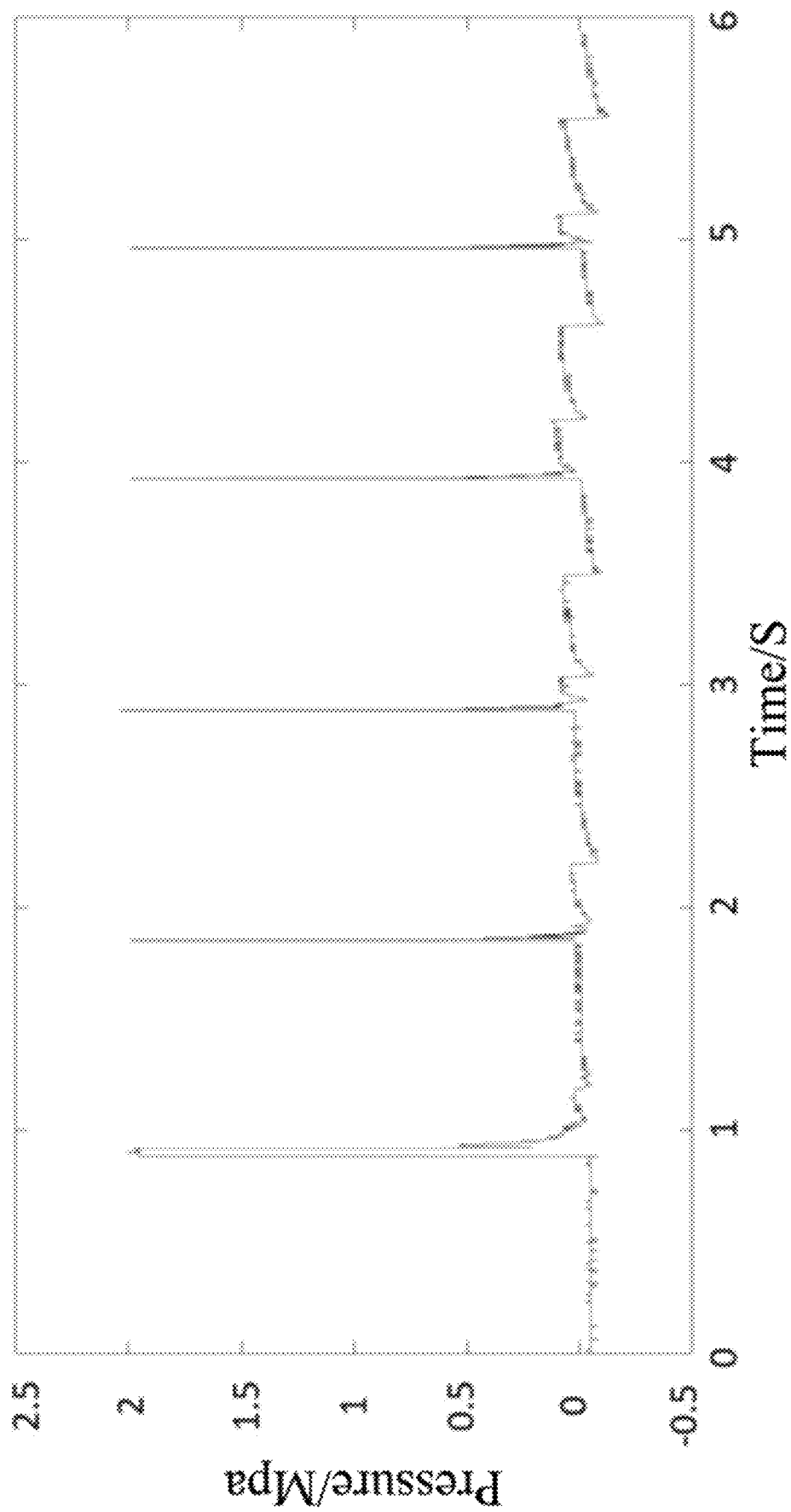
FIG. 7 is a schematic diagram of a pressure control mode step-input error curve for the multi-mode electro-hydraulic brake boosting system and the control method thereof in the present disclosure.

In order to verify the control effect of the multi-mode electro-hydraulic brake boosting system according to the present disclosure, firstly, the controller was set to be in a debugging mode, the system entered the electro-hydraulic hydraulic boosting mode, target pressure values of 2-10 MPa were input respectively, the time interval was about 1 s, and current master cylinder pressure values were collected and recorded. As shown in FIG. 6 and FIG. 7, in the figures, the curve lags for about 100 ms at the first step section, the rest of the step sections can quickly follow the target pressure, the response time is shorter than 100 ms, and when the pressure reaches 10 MPa, the pressure is gradually stabilized after slight shaking. Through analysis, due to the fact that the designed EHB boosting mechanism adopts the relative displacement sensor, a certain distance of pedal idle stroke exists, therefore, certain lag exists at the first step section, and the phenomenon does not occur in the actual driving process. After the pressure is stable, the pressure error can be controlled within 0.1 MPa. The test shows that control of the electro-hydraulic boosting mode designed by the present disclosure can achieve the effect of rapidly completing pressure build of the brake master cylinder during emergency braking.

4.2 Boosting Current Control Effect Test

Figure 8:
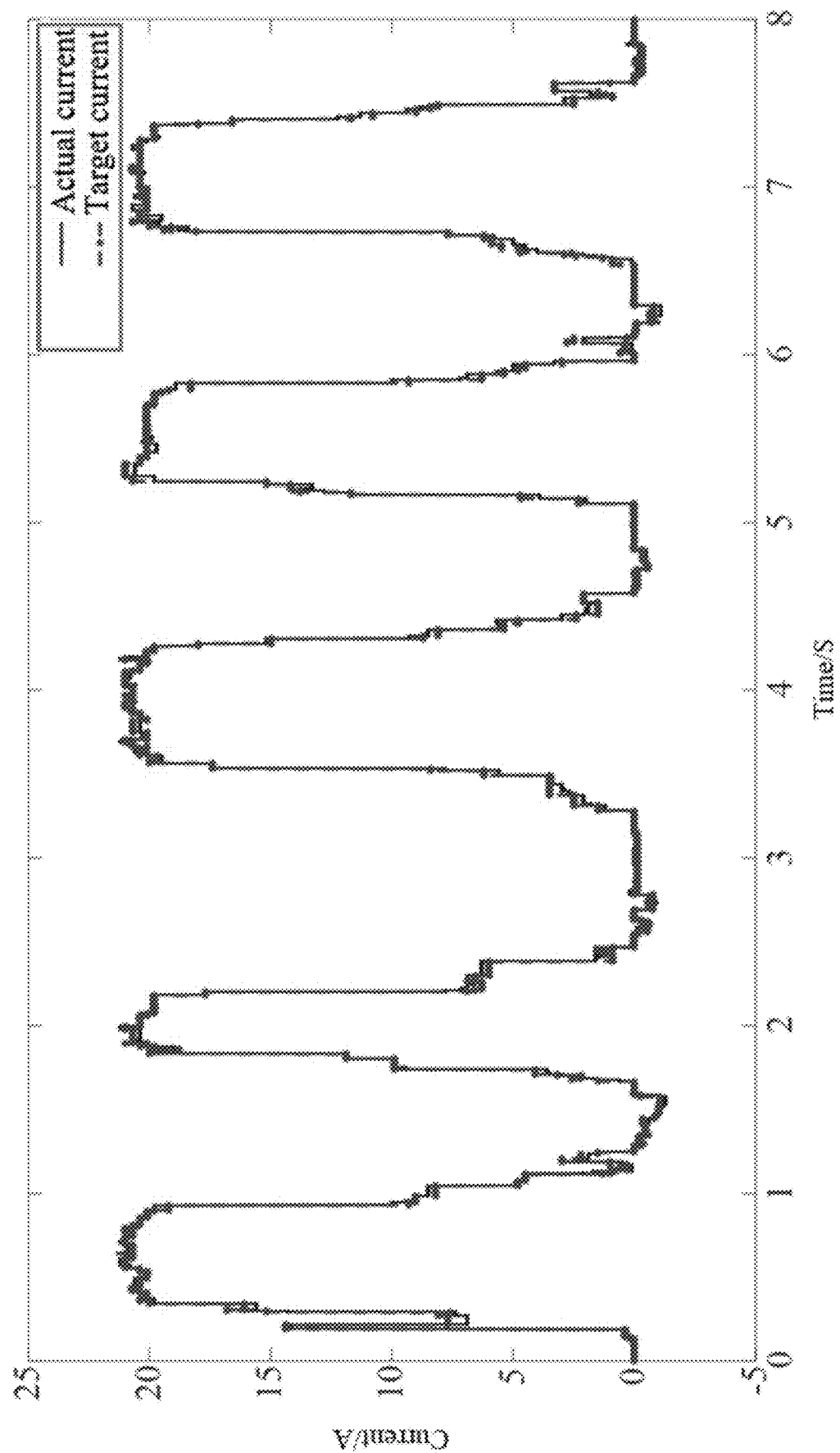
FIG. 8 is a schematic diagram of a boosting current control response curve for the EHB boosting system and the control method thereof based on driver intention recognition in the present disclosure.
Figure 9:
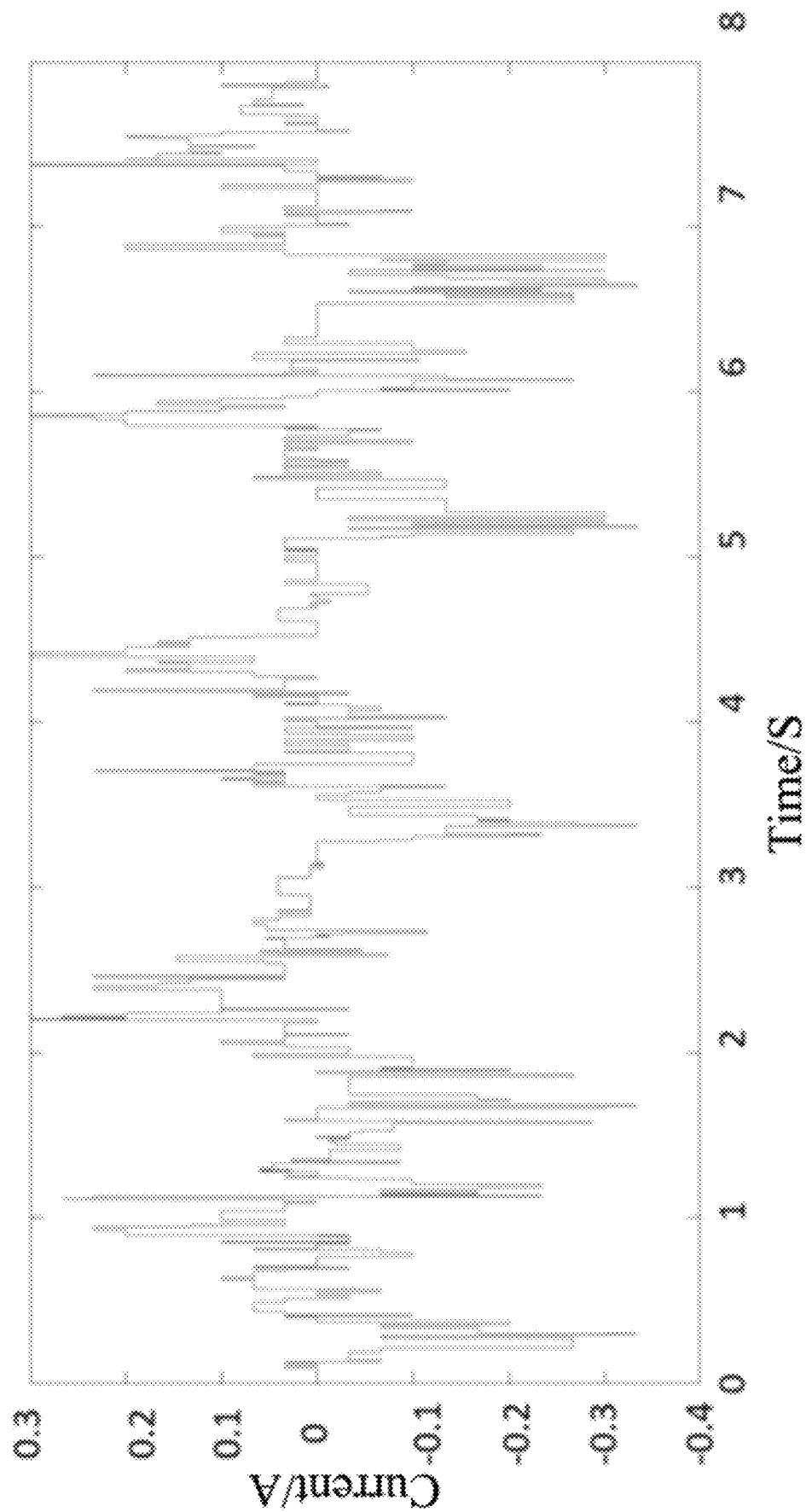
FIG. 9 is a schematic diagram of a boosting current control error curve for the multi-mode electro-hydraulic brake boosting system and the control method thereof in the present disclosure.

As shown in FIG. 8 and FIG. 9, when the control mode of the controller is switched to the general brake boosting mode, the brake pedal is continuously stepped on, maintained and loosened, and the expected boosting current value and the current actual boosting current are collected.

The boosting current error is in the range of −0.4 A+0.3 A, and no obvious lag phenomenon exists. At the moment, no obvious buffeting and foot jacking phenomena are caused by pedal force. Similarly, the current error is relatively large in the pedal idle stroke stage, but the pedal force and the boosting current are very small at the moment, so that the phenomenon of foot jacking of the driver is avoided. The test shows that the EHB boosting system can play a good boosting role in the general brake boosting mode.

4.3 Control Effect Test for Multi-Mode EHB Boosting System and Control Method In order to verify the control effect of the control method designed by the present disclosure, the control method is compared with a control method only having a boosting function. The driver simulates the emergency braking process and the general braking process respectively and presses about 70% of the stroke of the brake pedal, and pressure changes of the brake master cylinder are collected and are recorded as shown in FIG. 10 and FIG. 11.

Figure 10:
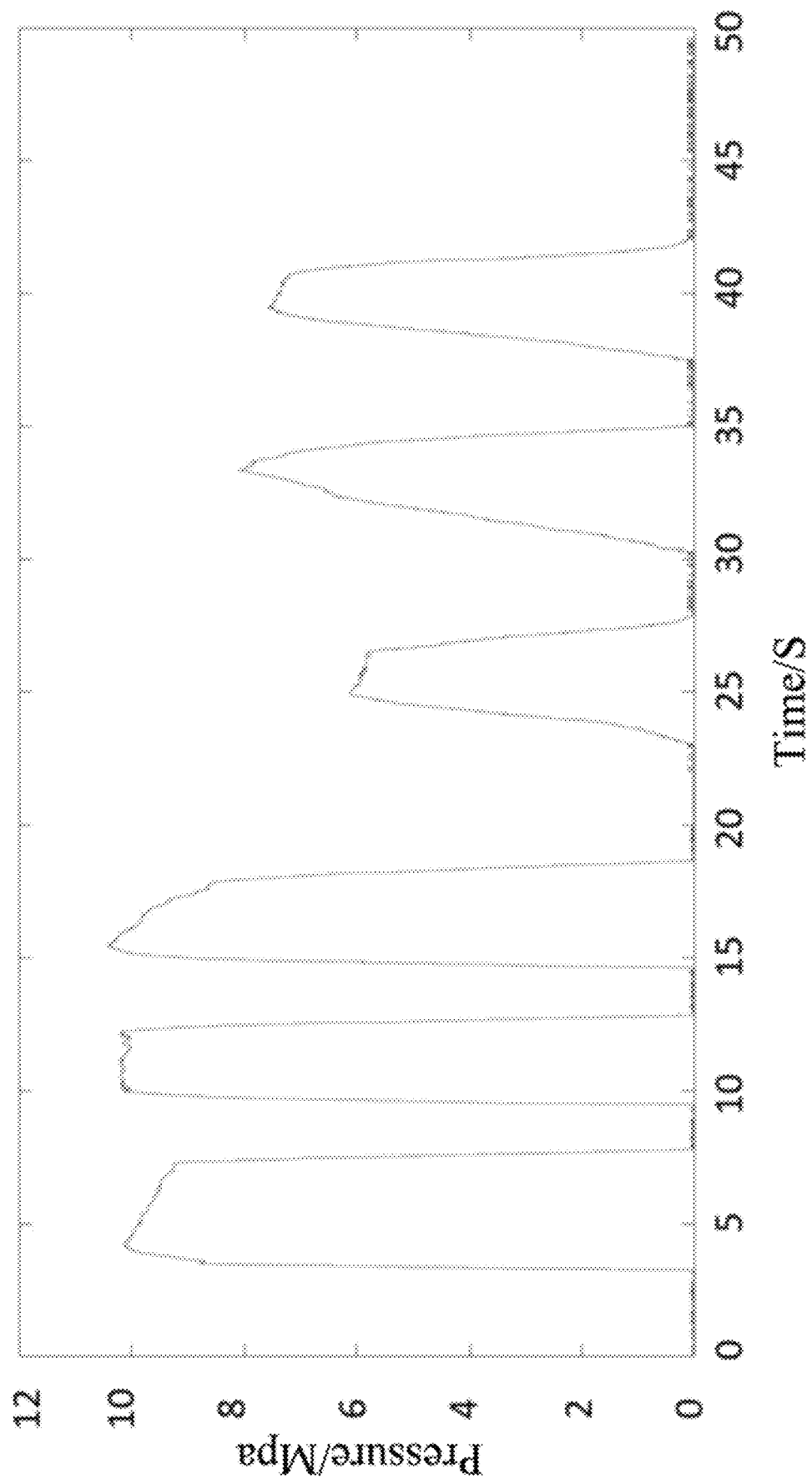
FIG. 10 is a schematic diagram of a test curve for the multi-mode electro-hydraulic brake boosting system and the control method thereof in the present disclosure.
Figure 11:
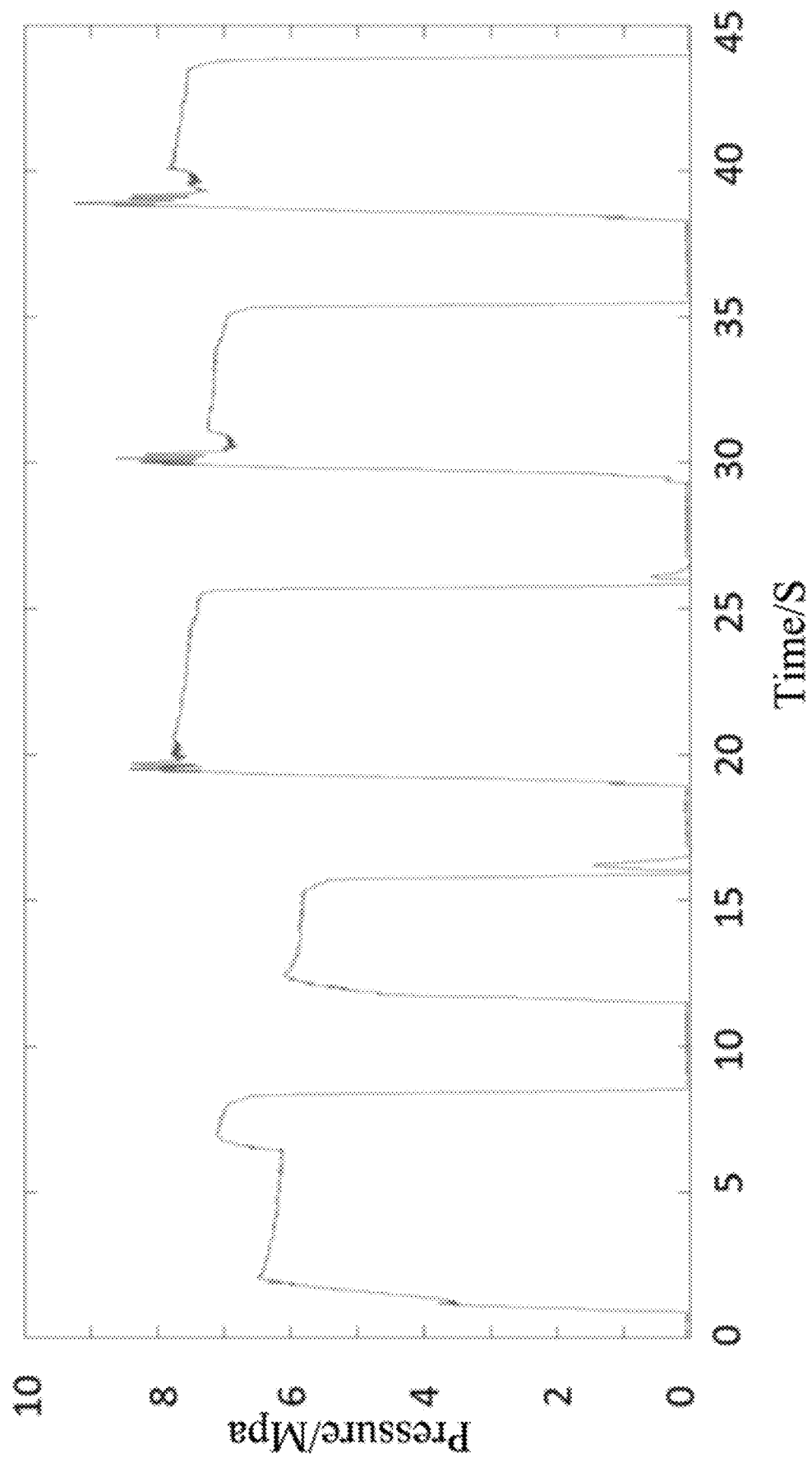
FIG. 11 is a schematic diagram of a common boosting current control test curve for the multi-mode electro-hydraulic brake boosting system and the control method thereof in the present disclosure.

As shown in FIG. 10, in the test of the boosting control method designed by the present disclosure, when the brake pedal is rapidly pressed down (such as the first three pressure peak curve sections in FIG. 11), the pressure of the brake master cylinder can rapidly reach 10 MPa, and the pressure buildup time of the master cylinder is within 100 ms. At the moment, when the brake pedal is pressed to a certain degree, a slight step missing feeling exists; and when the brake pedal is pressed down more gently (such as the last three pressure peak curve sections in FIG. 10), the system does not enter the emergency braking mode, and the pressure changes to about 7 Mpa along with the pedal action of the driver. And when only the general brake boosting mode is adopted, such as the five pressure peak curve sections in FIG. 11, when the brake pedal is rapidly pressed down, the pressure is only increased along with the deepening of the pedal action of the driver and reaches about 7 Mpa, and the active safety effect is be achieved.

The results show that the pressure of the brake master cylinder can quickly follow the target pressure in the electro-hydraulic boosting mode; in the boosting current control mode, the boosting current can preferably follow the target current; and compared with pressure curves when the brake pedal is pressed down quickly in a common control method and the boosting control method in the present disclosure, the pressure buildup process of the brake master cylinder can be completed more rapidly by the aid of the boosting control method.

It should be noted that the technical characteristics can continue to be combined with each other to form various embodiments not specifically set forth above, all of which are considered to be within the scope of the specification of the present disclosure; and for those skilled in the art, improvements or modifications may be made according to the description, but all of these improvements and modifications belong to the scope of protection of the claims of the present disclosure.

What is claimed is:

1. A multi-mode electro-hydraulic brake (EHB) boosting system, wherein the multi-mode EHB boosting system is a non-decoupling (EHB) boosting system provided with a relative displacement sensor, the multi-mode EHB boosting system is composed of a small gear, a motor, a brake master cylinder, a Hall sensor, a feed screw nut, a large gear, a pedal and a ball screw, the motor is meshed with the large gear through the small gear, the large gear is fixedly connected with the feed screw nut, the ball screw can slide along the axis of the feed screw nut, the pedal is connected with one end of the ball screw, the Hall sensor is installed at the other end of the ball screw, and a permanent magnet is embedded into a push head of the brake master cylinder, the pedal is connected with an inner core of the ball screw; the multi-mode EHB boosting system has two control working modes, namely an electro-hydraulic boosting mode and an emergency mechanical braking mode, wherein when the motor works, the motor rotates, the small gear drives the feed screw nut to rotate, and the feed screw nut is connected with the ball screw, so that the ball screw is pushed to move horizontally, the brake master cylinder is further pushed to be pressurized, meanwhile, the pedal is driven to move forwards, pressure buildup of the master cylinder is achieved, and the Hall sensor detects the distance between the ball screw and the bottom of the push head of the brake master cylinder, a signal is fed back to a controller for boosting current control, general braking or emergency braking is carried out, and the electro-hydraulic boosting mode is adopted at the moment;

in the electro-hydraulic boosting mode, the braking strength is divided into a general braking and an emergency braking, the multi-mode EHB boosting system regulates and controls the boosting magnitude according to a preset boosting curve and values collected by the Hall sensor in the general braking process, the multi-mode EHB boosting system enters an emergency active pressurizing control mode in the emergency braking process, when the multi-mode EHB boosting system is in the emergency active pressurizing control mode, the controller does not need boosting according to the values collected by the Hall sensor, but quickly drives the motor through active pressure control directly, and the pressure of the master cylinder is increased to a preset maximum pressure value; and when the motor does not work, the small gear, the motor, the brake master cylinder, the Hall sensor, the feed screw nut, the large gear, the pedal and the ball screw do not work anymore, acting force is generated by a driver through the pedal, the acting force is directly transmitted to the inner core of the ball screw, and then the force is transmitted to the push head of the master cylinder through direct contact between the inner core and the push head of the main master, the brake master cylinder is pushed to be pressurized to realize braking, and the emergency mechanical braking mode is adopted at the moment;

wherein the controller is a double-closed-loop electro-hydraulic boosting brake controller and consists of a PI controller and a fuzzy controller, wherein after target pressure is set, error between the target pressure and current pressure of the master cylinder and an error change rate obtained through a differential link are subjected to filtering processing and then serve as input to the fuzzy controller, parameter adjustment is carried out according to a fuzzy rule to obtain corrected values of two parameters of the PI controller so as to obtain final parameters of the controller, and PI control is carried out for the pressure of the master cylinder.

2. The multi-mode EHB boosting system of claim 1, wherein the multi-mode EHB boosting system is further equipped with a driving assistance system and is provided with a pressure sensor and a controller, the relative displacement sensor is used for collecting braking actions of the pedal, the pressure sensor is used for collecting pressure data of the brake master cylinder, and data of the relative displacement sensor and data of the pressure sensor are all uploaded to the controller, and the braking working condition and the braking strength are judged through the collected data.

3. The multi-mode EHB boosting system of claim 1, wherein, in the general braking process, the multi-mode EHB boosting system adopts the general brake boosting mode; and in the emergency braking process, the multi-mode EHB boosting system immediately enters the emergency active pressurizing mode, the motor is rapidly controlled by the brake controller to achieve rapid pressure buildup of the brake master cylinder, braking is carried out, target pressure is given to be the preset maximum pressure of the brake master cylinder, and the pressure of the multi-mode EHB boosting system is fed back in real time through the pressure sensor.

* * * * *